Patented Dec. 28, 1943

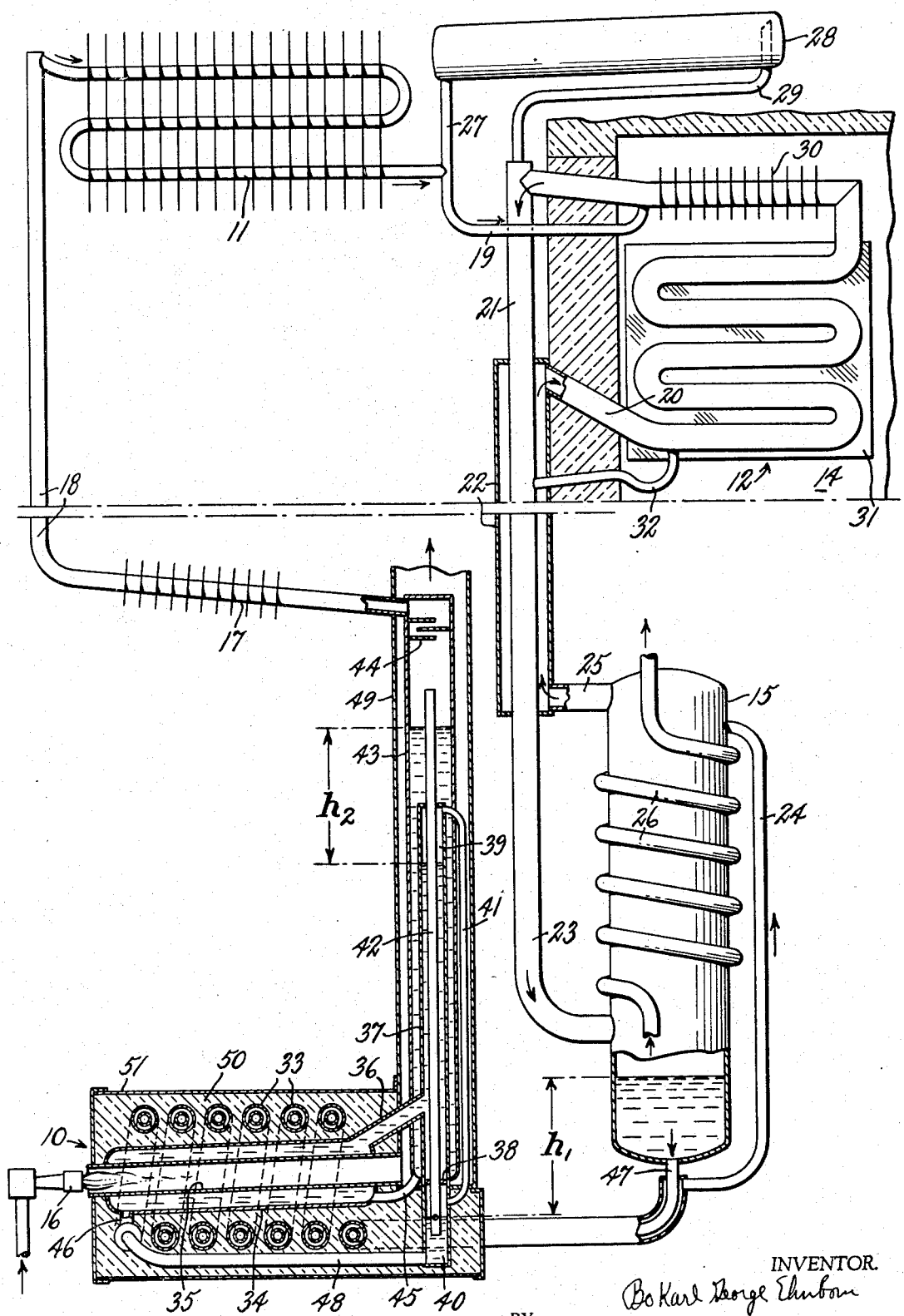

2,337,653

UNITED STATES PATENT OFFICE 2,337,653

REFRIGERATION

Bo Karl George Ehnbom, Stockholm, Sweden, assignor to Platen-Munters Refrigerating System Aktiebolag, Stockholm, Sweden, a corporation of Sweden Application March 26, 1940, Serial No. 325,956

11 Claims. (Cl. 62—119.5)

This invention relates to refrigeration, and more particularly to absorption refrigeration systems of the type employing an inert gas or pressure equalizing agent.

It is an object of the invention to effect improvements in systems of this type, particularly to reduce heat radiation losses from the system and to provide a simple and compact arrangement of parts which facilitates fabrication and also reduces the amount of space occupied by the system in a refrigerator cabinet of the household type.

This is accomplished by flowing fluids in the system in heat exchange relation in a new and novel manner to effect conservation of heat. In the present embodiment absorption liquid enriched in refrigerant and flowing from an absorber to a generator is raised by vapor-liquid lift action in a vertically extending tube which is disposed about a body of relatively warm absorption liquid held in a standpipe. The relatively warm absorption liquid held in the standpipe is surrounded by a body of the raised absorption liquid which is held in an elongated vessel and from which such absorption liquid flows to a place of vapor expulsion. The expelled vapor passes upwardly through the relatively warm liquid held in the standpipe and all of the expelled vapor is then utilized to raise enriched absorption liquid in the vapor-liquid lift tube. With this arrangement relatively warm absorption liquid in the standpipe is effectively utilized to maintain the vapor-liquid lift tube in a heated condition for heating enriched absorption liquid raised in the latter; and heat is also retained in such relatively warm liquid by the body of raised liquid which surrounds the standpipe and from which liquid flows to the place of vapor expulsion. The vapor-liquid lift tube, standpipe and elongated vessel, may be arranged within an extension of a flue through which heated products of combustion from a burner pass to be discharged to the atmosphere. In addition to reducing heat radiation losses by conserving heat in the system, the path of flow of expelled vapor is such that the vapor is effectively analyzed so that the refrigerant vapor introduced into the condenser is substantially free of accompanying vapor of absorption liquid.

To provide a compact arrangement of parts of the refrigeration system a liquid heat exchanger, through which absorption liquid flows through and between the generator and an absorber, is arranged about the generator, whereby only a single body of insulation about the liquid heat exchanger and generator is necessary. By arranging the liquid heat exchanger about the generator a further advantage is obtained in that a heat zone is produced about the generator to reduce heat radiation losses from the latter.

The invention, together with the above and other objects and advantages thereof, will be better understood from the following description taken in conjunction with the accompanying drawing forming a part of this specification, and of which the single figure more or less diagrammatically illustrates a refrigeration system embodying the invention.

In the drawing the present improvement is embodied in an absorption refrigeration system of a type containing a pressure equalizing agent. Such a system includes a generator 10, condenser 11, a cooling unit 12 arranged in a thermally insulated storage space 14 and an absorber 15. The system contains a solution of refrigerant in absorption liquid, such as ammonia in water, for example, and also an auxiliary agent or inert gas, such as hydrogen.

The generator 10 is heated in any suitable manner, as by a gas burner 16, for example, whereby vapor is expelled from solution in generator 10. The expelled vapor flows from generator 10 to an air-cooled rectifier 17, as will be described hereinafter, and from the rectifier 17 the vapor flows through a conduit 18 into condenser 11 in which it is liquefied. Liquid refrigerant flows from condenser 11 to cooling unit 12 through a conduit 19 which is U-shaped to form a liquid trap.

Refrigerant fluid in cooling unit 12 evaporates and diffuses into inert gas which enters through conduit 20. Due to evaporation of refrigerant fluid into inert gas, a refrigerating effect is produced with consequent absorption of heat from the surroundings. The rich gas mixture of refrigerant vapor and inert gas formed in cooling unit 12 flows from the upper part thereof through a conduit 21, inner passage of a gas heat exchanger 22, and a conduit 23 into the lower part of absorber 15.

In absorber 15 the rich gas mixture flows countercurrent to downwardly flowing weak absorption liquid which enters through a conduit 24. The absorption liquid absorbs refrigerant vapor from the inert gas, and inert gas weak in refrigerant flows from absorber 15 through a conduit 25, outer passage of gas heat exchanger 22, and conduit 20 into the lower part of cooling unit 12.

The circulation of gas in the gas circuit just described is due to the difference in specific weight of the columns of gas rich and weak, respectively, in refrigerant vapor. Since the rich gas is heavier than the weak gas, a force is produced or developed within the system for causing flow of rich gas to the absorber 15 and flow of weak gas toward cooling unit 12.

Absorption liquid enriched in refrigerant flows from the lower part of absorber 14 to generator 10, as will be presently described; and vapor is expelled from solution in generator 10 and flows upward to condenser 11, as explained above.

Heat liberated with absorption of refrigerant vapor of absorber 15 is transferred to a suitable cooling medium which circulates through a coil 26 arranged in heat exchange relation with the absorber.

The outlet end of condenser 11 is connected by a conduit 27, vessel 28, and conduit 29 to the gas circuit, as to the upper end of conduit 21, for example, so that any inert gas which may pass through the condenser can flow into the gas circuit. Refrigerant vapor not liquefied in condenser 11 flows through conduit 27 to displace inert gas in vessel 28 and force such gas through conduit 29 to the gas circuit. The effect of forcing gas into the gas circuit in this manner is to increase the total pressure in the system to ensure condensation of refrigerant vapor in condenser 11.

The upper part of cooling unit 12 is formed with heat transfer fins 30 to provide a relatively extensive heat transfer surface for cooling air in the thermally insulated storage space 14. The lower part of cooling unit 12 may be arranged in heat exchange relation with a shell 31 having compartments for freezing water and the like.

A drain conduit 32 is connected to the lower part of cooling unit 12 and to the inner passage of gas heat exchanger 22 to permit unevaporated liquid to drain from the cooling unit into the path of flow of the rich gas mixture.

In accordance with this invention a liquid heat exchanger 33, through which absorption liquid circulates through and between the generator 10 and absorber 15, is arranged about the generator 10. As shown, the generator 10 includes a jacket or shell 34 having a flue 35 into the lower end of which projects the flame produced by the burner 16. The generator 10 is inclined slightly and disposed more or less in a horizontal plane, and the liquid heat exchanger 33 is in the form of a pipe coil disposed about the jacket 34. The lower end of an inclined conduit 36 is connected to the upper end of shell 34 and the upper end thereof is connected to a vertical standpipe 37. The standpipe 37 is provided with a baffle plate 38 adjacent the lower end thereof to form separate chambers 39 and 40. A vertical conduit 41 is connected at its upper end to the upper part of chamber 39 and at its lower end to chamber 40. A vertical tube 42 having the lower end thereof in chamber 40 extends upwardly through the latter and chamber 39, and the upper end thereof is at a level above the point at which conduit 24 is connected to absorber 15.

About the standpipe 39 is arranged a vertically elongated vessel 43 which completely encloses the chamber 39 and extends upwardly above the tube 42. The upper end of elongated vessel 43 is connected to the air cooled rectifier 17 and in the upper part thereof are provided a plurality of baffle plates 44.

The lower end of vessel 43 is connected by a conduit 45 to the right-hand end of shell 34.

The lower or left-hand end of shell 34 is connected by a conduit 46 to one end of the outer passage of liquid heat exchanger 33. The opposite end of the outer passage of liquid heat exchanger 33 is connected to the lower end of conduit 24. The lower part of absorber 15 is connected by a conduit 47 to one end of the inner passage of liquid heat exchanger 33. The opposite end of the inner passage of liquid heat exchanger 33 is connected by a conduit 48 to the chamber 40.

A cylindrical pipe 49 is disposed about and in spaced relation with the elongated vessel 43. The cylindrical pipe 49 serves as an extension of flue 35, whereby the heated products of combustion from the burner flame flow through flue 35 and rise upwardly in pipe 49. The pipe 49 may be formed of any suitable fireproof material, such as asbestos and the like, for example.

The generator 10, liquid heat exchanger 33 and chamber 40 are all embedded in a single body of insulation 50 retained in position within a metallic shell 51.

During operation of the refrigeration system, as explained above, vapor is expelled from solution in shell 34 of generator 10 due to heating by the gas burner 16. The vapor bubbles freely flow past liquid in conduit 36 and in the standpipe 37. The vapor flows from the upper part of chamber 39 through conduit 41 into chamber 40. Absorption liquid enriched in refrigerant is raised in a well-known manner by vapor-liquid lift action through tube 42 from chamber 40 into the upper part of the vertically elongated vessel 43. The lifting vapor is separated from the raised liquid in the upper part of vessel 43 and flows through the air cooled rectifier 17 and conduit 18 into condenser 11 in which it is liquefied, as explained above.

Absorption liquid enriched in refrigerant flows from the lower part of vessel 43 through conduit 45 into the shell 34 which constitutes a place of vapor expulsion and in which vapor is expelled from solution. Absorption liquid from which refrigerant has been expelled flows through conduit 46 into the outer passage of liquid heat exchanger 33 and conduit 24 into the upper part of absorber 15. In absorber 15 refrigerant vapor is absorbed from the inert gas, and absorption liquid enriched in refrigerant flows from the lower part of absorber 15 through conduit 47, the inner passage of liquid heat exchanger 33, and conduit 48 into the chamber 40. Absorption liquid is raised through thermosiphon tube 42 from the chamber 40 to the upper part of elongated vessel 43, as explained above. By raising absorption liquid in tube 42, liquid can flow by gravity through vessel 43 and chamber 34 to the upper part of absorber 15, and continue to flow by gravity through absorber 15, liquid heat exchanger 33 and conduit 48 to chamber 40.

The difference in liquid levels in the absorber 15 and the chamber 40 is indicated as $h_1$ in the drawing, and this difference in liquid levels represents the reaction head for balancing the column of liquid slugs and vapor raised in vapor-liquid lift tube 42. The difference in liquid levels in standpipe 37 and elongated vessel 43 is indicated as $h_2$ in the drawing, and this difference in liquid levels is the same as $h_1$.

The vapor expelled from solution in shell 34 not only includes refrigerant vapor but also some absorption liquid vapor which accompanies the refrigerant vapor. In standpipe 37 the expelled vapor flows in intimate contact with the body of absorption liquid held therein. Since there is a temperature gradient through the absorption liquid in shell 34 and standpipe 37 with the temperature being highest at the left-hand end of shell 34 and lowest at the upper end of standpipe 37, some absorption liquid vapor accompanying the refrigerant vapor is condensed in the standpipe 37. Since condensation of absorption liquid vapor takes place in standpipe 37, that is, in chamber 39, the chamber 39 may be referred to as an analyzer. The heat of condensation resulting from condensing of absorption liquid vapor is effectively retained in the body of liquid in chamber 39 because of the blanketing effect of the surrounding body of liquid held in elongated vessel 43. This heat of condensation is effective to cause expulsion of refrigerant vapor from solution in chamber 39.

The expelled vapor rises freely in the body of absorption liquid in standpipe 37 to the upper part of chamber 39. This vapor, which has now been deprived to some extent of accompanying absorption liquid vapor, flows from the upper part of chamber 39 through conduit 41 into chamber 40. The vapor flows in intimate contact with rich absorption liquid in lift tube 42. Absorption liquid vapor accompanying the refrigerant vapor is condensed while substantially no refrigerant vapor is absorbed by the enriched liquid raised in lift tube 42.

The refrigerant vapor, which has now been further deprived of accompanying absorption liquid vapor, flows through the upper part of vessel 43 past the baffle plates 44 into the air-cooled rectifier 17. Further condensation of accompanying absorption liquid vapor takes place in air-cooled rectifier 17, so that refrigerant vapor substantially free of accompanying absorption liquid vapor continues to flow through conduit 18 into condenser 11.

The absorption liquid in shell 34 is at the highest temperature adjacent the conduit 46, and at this region the absorption liquid is weakest in refrigerant. The weak absorption liquid is withdrawn from generator 10 through conduit 46, and, in order to conserve as much heat in this withdrawn liquid, heat is transferred from this liquid to comparatively cool absorption liquid flowing from absorber 15 to generator 10. The first place where heat is transferred from weak liquid to absorption liquid rich in refrigerant is in the liquid heat exchanger 33. After enriched absorption liquid is warmed in liquid heat exchange 33, the enriched liquid flows through conduit 46 into chamber 40 and is then raised through lift tube 42 by all of the vapor expelled from solution in generator and flowing through conduit 41. The tube 42 is kept in a heated condition by the surrounding body of liquid in standpipe 42 which in turn is enveloped by the body of liquid in elongated vessel 43. The bodies of liquid in standpipe 37 and elongated vessel 43 are maintained in a heated condition by the heated products of combustion passing through the flue extension 49. The body of liquid in vessel 43 is the warmest since it is more or less directly heated through the wall of vessel 43 by the heated products of combustion. The liquid in chamber 39 is next warmest and the temperature of the liquid in lift tube 42 is less than that of the surrounding liquid in chamber 39. It will be apparent, therefore, that after the enriched absorption liquid passes through the liquid heat exchanger 33, it is further heated in the lift tube 42 and still further heated in the elongated vessel 43.

Since the temperature of the liquid in vessel 43 is gradient with the temperature increasing as the liquid flows downward therein, the liquid is withdrawn from the lower part of vessel 43 through conduit 46 and enters shell 34 of the generator at a relatively high temperature. With the arrangement provided, heat in the system is effectively conserved with the heat radiation losses being at a minimum. Since the heated products of combustion envelop the liquid in elongated vessel 43, it is not absolutely necessary to provide insulation about the flue extension 49, although such insulation may be employed, if desired.

Since the liquid heat exchanger 33 is at a relatively high temperature, the temperature difference between the zone of the liquid heat exchanger 33 and the shell 34 of generator 10 is reduced by locating the liquid heat exchanger 33 about the generator. With this arrangement radiation of heat from the generator 10 is reduced to reduce heat radiation losses in the system. By conserving heat in the manner explained above and shown in the drawing, the refrigeration system may be operated with less heat input to produce the same amount of refrigeration produced by a similar system with a larger heat input and when no provision is made to reduce heat losses from the system.

Although a single embodiment of the invention has been shown and described, it will be apparent to those skilled in the art that changes and modifications may be made without departing from the spirit and scope of the invention, as pointed out in the following claims.

What is claimed is:

1. In an absorption refrigeration system having a generator, an absorber, and a liquid heat exchanger, a circuit for absorption liquid including said elements and a standpipe and a vertically elongated vessel both connected at their lower ends to said generator, said vessel being disposed about said standpipe and holding a body of liquid flowing to said generator and enveloping a body of liquid in said standpipe, and a vapor liquid lift extending through said standpipe and terminating in the upper part of said vessel for causing circulation of liquid in said circuit.

2. In an absorption refrigerating apparatus, a boiler, a heater for said boiler, a standpipe connected to said boiler and extending vertically thereabove, means forming a chamber below said standpipe, a conduit connected to said chamber for supplying rich absorption liquid thereto, means for conducting vapor from said standpipe to said chamber, a vertically extending vessel surrounding said standpipe, a vapor liquid lift conduit for raising liquid and vapor from said chamber to the upper part of said vessel, a vapor withdrawal conduit connected to the upper part of said vessel, means connecting the lower part of said vessel and said boiler, and a conduit for withdrawing weak absorption liquid from said boiler.

3. In absorption refrigerating apparatus, a substantially horizontal boiler, a flue extending through said boiler, a standpipe connected at the bottom to said boiler and extending vertically thereabove, means forming a chamber below said standpipe, means for supplying rich absorption liquid to said chamber, means for conducting gas from said standpipe to said chamber, a vessel surrounding said standpipe, a jacket surrounding said vessel and connected to said flue, a thermosiphon conduit for raising liquid and vapor from said chamber to the upper part of said vessel, conduit means for withdrawing refrigerant vapor from the upper part of said vessel, a conduit connecting the lower part of said vessel and said boiler, and means for withdrawing weak absorption liquid from said boiler.

4. An absorption refrigeration system including a generator having a heating flue, a plurality of standpipes arranged one within another and connected to communicate individually with said generator, an absorber, a vapor liquid lift conduit connected to receive liquid from said absorber and discharge into a first of said standpipes, means for conducting vapor from a second of said standpipes to said vapor liquid lift, a conduit for withdrawing vapor from said first standpipe, and means forming an extension of said flue and enclosing said standpipes.

5. An absorption refrigeration system including a generator having a chamber adapted to be heated to cause expulsion of refrigerant vapor from absorption liquid in the chamber, and a plurality of liquid standpipes located in heat exchange relation to each other and having the lower parts thereof connected to communicate individually with said chamber.

6. An absorption refrigeration system including a generator having a chamber adapted to be heated to cause expulsion of refrigerant vapor from absorption liquid in the chamber, and a plurality of liquid standpipes located one within another and having the lower parts thereof connected to communicate individually with said chamber.

7. An absorption refrigeration system as in claim 5 which also includes a flue for heating said chamber, and a continuation of said flue in heat exchange relation with said standpipes.

8. An absorption refrigeration system as in claim 5 which also includes an absorber, and a conduit for conducting liquid from said absorber to said generator having a part in heat exchange relation with said standpipes.

9. An absorption refrigeration system as in claim 6 which also includes a vapor lift conduit for raising liquid into one of said standpipes and projecting upward within said standpipes.

10. An absorption refrigeration system including a generator having a chamber adapted to be heated to cause expulsion of refrigerant vapor from absorption liquid therein, a plurality of standpipes located in heat exchange relation with each other and connected to communicate individually with said chamber, a vapor liquid lift for raising liquid into one of said standpipes, and a conduit for conducting vapor from the other of said standpipes to said lift for operation thereof.

11. An absorption refrigeration system including a generator having a conduit forming a passage for hot fluid for heating said generator, a second conduit forming a continuation of said first conduit and connected to receive fluid from said first conduit, an absorber, a third conduit for conducting absorption liquid from said absorber to said generator, a part of said third conduit comprising a standpipe connected to said generator, another part of said third conduit comprising a vapor liquid lift through which liquid is raised into said standpipe, both parts of said third conduit being located within said second conduit.

BO KARL GEORGE EHNBOM.